United States Patent
Yazaki (10) Patent No.: US 11,973,281 B2
(45) Date of Patent: Apr. 30, 2024

(54) WIRELESS COMMUNICATION DEVICE

(71) Applicant: Murata Manufacturing Co., Ltd., Nagaokakyo (JP)

(72) Inventor: Hirokazu Yazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 730 days.

(21) Appl. No.: 17/097,637

(22) Filed: Nov. 13, 2020

(65) Prior Publication Data
US 2021/0083390 A1 Mar. 18, 2021

Related U.S. Application Data (63) Continuation of application No. PCT/JP2019/012088, filed on Mar. 22, 2019.

(30) Foreign Application Priority Data

Jul. 20, 2018 (JP) .................................. 2018-136394

(51) Int. Cl.
G06K 19/07 (2006.01)
G06K 19/077 (2006.01)
(Continued)

(52) U.S. Cl.
CPC ............ *H01Q 9/26* (2013.01); *G06K 19/077* (2013.01); *H01Q 1/002* (2013.01); *H01Q 1/38* (2013.01)

(58) Field of Classification Search
CPC .......... H01Q 9/26; H01Q 1/002; H01Q 1/38; H01Q 1/2225; G06K 19/077; G06K 19/07798
(Continued)

(56) References Cited

U.S. PATENT DOCUMENTS

2008/0189623 A1* 8/2008 Patil ...................... H04L 51/234
715/753
2008/0238784 A1* 10/2008 Ohashi ................. H01Q 1/2225
343/700 MS
2018/0189623 A1 7/2018 Forster et al.

FOREIGN PATENT DOCUMENTS

CN 107371387 A * 11/2017 ............. H01F 27/22
JP 47-009014 * 3/1972
(Continued)

OTHER PUBLICATIONS

International Search Report issued for PCT/JP2019/012088, dated May 21, 2019.
(Continued)

*Primary Examiner* — Tanmay K Shah
(74) *Attorney, Agent, or Firm* — Arentfox Shiff LLP (57) ABSTRACT

An RFID tag is provided that transmits and receives a communication signal. The RFID tag includes a base material, an antenna pattern provided on the base material, and an expansion member. The expansion member is disposed adjacent to the antenna pattern and has a coefficient of linear expansion that is higher than coefficients of linear expansion of the antenna pattern. When the RFID tag is subjected to an electromagnetic wave heating microwave, and thus the temperature of each portion rises, the antenna pattern breaks at a position of the expansion member. With this configuration, ignition and combustion are able to be prevented even in a situation in which the RFID tag is subjected to high-frequency power for heating a food item while being attached to the food item.

20 Claims, 9 Drawing Sheets

(51) Int. Cl.
　　　*G08B 13/24* 　　　(2006.01)
　　　*H01Q 1/00* 　　　(2006.01)
　　　*H01Q 1/38* 　　　(2006.01)
　　　*H01Q 9/26* 　　　(2006.01)
　　　*H04W 4/80* 　　　(2018.01)

(58) Field of Classification Search
　　　USPC ..................................................... 340/572.7
　　　See application file for complete search history.

(56) References Cited

FOREIGN PATENT DOCUMENTS

| JP | S47009014 B1 | | 3/1972 |
|---|---|---|---|
| JP | 2006338563 A | | 12/2006 |
| JP | 2007089054 A | * | 4/2007 |
| JP | 2007089054 A | | 4/2007 |

OTHER PUBLICATIONS

Written Opinion of the International Searching Authority issued for PCT/JP2019/012088, dated May 21, 2019.

* cited by examiner

λ/4 RESONANCE fo

Fig. 2B

λ/2 RESONANCE 2fo

Fig. 2C

3λ/4 RESONANCE 3fo

Fig. 2D

λ RESONANCE 4fo

Fig. 9B

WIRELESS COMMUNICATION DEVICE

CROSS REFERENCE TO RELATED APPLICATIONS

The present application is a continuation of PCT/JP2019/012088 filed Mar. 22, 2019, which claims priority to Japanese Patent Application No. 2018-136394, filed Jul. 20, 2018, the entire contents of each of which are incorporated herein by reference.

TECHNICAL FIELD

The present disclosure relates to a wireless communication device including an antenna, and, more particularly, to a wireless communication device such as an RFID ("Radio Frequency Identification") tag that conducts near field communication through an induced electromagnetic field or an electromagnetic wave.

BACKGROUND

An RFID tag as a wireless communication device is used in various situations because the RFID tag communicates with a reader and writer and reading and writing operations of predetermined information are performed in a noncontact manner. For example, so-called self-checkout can be smoothly performed by attaching the RFID tag to all products. In addition, management of sales and distribution conditions such as securing of traceability and marketing is smoothly performed.

On the other hand, a wide variety of products are handled in stores such as a convenience store and a supermarket, and, among food items as products, there are some products that are heated immediately after the products are purchased, to be taken out, or to be immediately eaten or drunk on the spot by a purchaser. For example, a lunch box or a prepared dish may sometimes be heated at a store using an electromagnetic wave heating device, such as a microwave oven.

However, when the product to which the RFID tag is attached is heated using the microwave oven, the following problems sometimes arise.

While, as a frequency of a communication signal of the RFID tag, an LF band of 135 kHz or less, an HF band such as 13.56 MHz, a UHF band such as a band of 860 MHz to 960 MHz, and a microwave band such as 2.45 GHz are mainly used, at present, the RFID tag of the type attached to the food items is the RFID tag in which the UHF band is used. In the RFID tag in which the UHF band is used, a metal material such as an antenna pattern that is a metal film body is provided on a base material such as paper or a resin together with an RFIC (Radio-Frequency Integrated Circuit) element.

When such a product to which the RFID tag is attached is heated in the microwave oven, energy of an electromagnetic wave from the microwave oven is absorbed by the RFID tag together with the product. Consequently, there is a risk that the RFID tag or a portion of the product to which the RFID tag is attached may ignite due to, for example, one or more of discharge at a place in which electric field strength is enhanced in the metal material, heat generation and sublimation of the metal material due to an overcurrent flowing in the metal material, and/or heat generation of the base material of the RFID tag.

In particular, since a high-power electromagnetic wave of about 3 kW is radiated inside a chamber of the microwave oven installed in the convenience store, and the RFID tag is heated at once immediately after the start of heating, there is a high risk of ignition depending on conditions.

In order to reduce the risk of ignition in such RFID tags, certain configurations of a flame-retardant tag have been proposed, such as that described in Patent Literature 1.

Patent Literature 1: Japanese Unexamined Patent Application Publication No. 2006-338563.

The flame-retardant tag disclosed in Patent Literature 1 is a tag in which the base material on which an IC chip and an antenna pattern are mounted is made of a flame-retardant material. For this reason, combustion of the base material is reduced or prevented. However, the metal material provided on the base material has a high possibility of temporally continuous discharge, and there is currently no configuration that can surely prevent the risk of ignition of the base material and the possibility that the product catches fire.

SUMMARY OF THE INVENTION

An object of the exemplary embodiments of the present invention is to provide a wireless communication device that prevents ignition and combustion even in a situation in which the wireless communication device is subjected to high-frequency power for heating a food item while being attached to the food item or the like.

Accordingly, in an exemplary aspect, a wireless communication device is provided that transmits and receives a communication signal and that includes a base material, an antenna pattern provided on the base material, and an expansion member disposed adjacent to the antenna pattern and having a coefficient of linear expansion that is higher than coefficients of linear expansion of the antenna pattern and the base material.

According to the above structure and configuration, when the wireless communication device is irradiated with high-frequency power of an electromagnetic wave heating microwave band, a large current flows in the antenna pattern and heat is generated. Alternatively, heat is generated by discharge at a place of the antenna pattern where a potential difference is large. Due to this heat generation, a tensile stress is applied to the antenna pattern at a position which this expansion member is disposed adjacent to, so that the antenna pattern breaks. When the antenna pattern breaks, the above-described large current does not flow, and the heat generation is stopped. Alternatively, due to the breaking of the antenna pattern, the potential difference at the discharge position disappears or decreases, and the discharge is not maintained, so that the heat generation of the antenna pattern is stopped. In any case, the ignition of the base material does not occur. In this manner, melting and deformation of the wireless communication device or the portion of the product to which the wireless communication device is attached are also prevented.

According to the exemplary embodiments of the present invention, a wireless communication device is provided that prevents the ignition and combustion even when the wireless communication device is subjected to the high-frequency power for heating the food items while being attached to the food items or the like is able to be obtained.

DETAILED DESCRIPTION OF EXEMPLARY EMBODIMENTS

First, configurations of various exemplary aspects in a wireless communication device according to the present invention will be described.

A wireless communication device according to a first exemplary aspect is provided that transmits and receives a communication signal and that includes a base material, an antenna pattern provided on this base material, and an expansion member disposed adjacent to this antenna pattern and having a coefficient of linear expansion that is higher than coefficients of linear expansion of the antenna pattern and the base material.

When the wireless communication device of the first exemplary aspect is subject to the irradiation of the microwave in the chamber of the microwave oven, for example, a large current is induced in the antenna pattern and thus the antenna pattern generates heat, or discharge occurs at a place of the antenna pattern where a large potential difference is generated and thus the antenna pattern generates heat. Due to this heat generation, the expansion member expands, and a tensile stress is applied to the antenna pattern at a position which this expansion member is disposed adjacent to, so that the antenna pattern breaks. When the antenna pattern breaks, the above-described large current does not flow, and the heat generation is stopped. Alternatively, due to the breaking of the antenna pattern, the potential difference at the discharge position disappears or decreases, and the discharge is not maintained, so that the heat generation of the antenna pattern is stopped. In any case, the ignition of the base material can be prevented and does not occur. In this manner, melting and deformation of the wireless communication device or the portion of the product to which the wireless communication device is attached are also prevented.

In a wireless communication device of a second exemplary aspect, the expansion member is disposed in contact with a portion of the antenna pattern. According to this configuration, the stress applied to the antenna pattern due to the expansion of the expansion member is effectively increased, and the antenna pattern breaks quickly.

In a wireless communication device of a third exemplary aspect, the expansion member is provided at a breaking position such that breaking of the antenna pattern at the breaking position causes resonance at a frequency of an electromagnetic wave heating microwave not to be maintained. According to this configuration, when the antenna pattern breaks at the position of the expansion member, the antenna pattern immediately stops the heat generation due to the resonance at the frequency of the electromagnetic wave heating microwave band, so that a temperature rise is effectively reduced or prevented.

In a wireless communication device of a fourth exemplary aspect, the antenna pattern is in contact with the base material, and the coefficient of linear expansion of the base material is higher than the coefficient of linear expansion of the antenna pattern. According to this configuration, a tensile stress is applied to the antenna pattern due to relative expansion of the expansion member and the base material, and the antenna pattern breaks more quickly.

In a wireless communication device of a fifth exemplary aspect, the expansion member is made of a resin material, and the antenna pattern is made of metal foil. According to this configuration, the expansion coefficient of the expansion member can be easily increased, and the tensile strength of the antenna pattern can be reduced, so that the amount of the heat generation of the antenna pattern that is required for the antenna pattern to break is reduced. In other words, the antenna pattern breaks quickly after the start of microwave heating.

In a convenience store and a supermarket that sell a product to which a wireless communication device is attached, a wide variety of products such as food items and household goods are handled. In recent years, regarding the convenience store, various experiments have been conducted toward practical application of an "unmanned" convenience store that automates accounting and packing of a purchased product.

In order to automate the accounting of the product in the unmanned convenience store, it is considered that an RFID tag configured as a wireless communication device is attached to all the products. In the unmanned convenience store, a system is provided such that information from the RFID tag is read to display a product price when a shopping basket that accommodates a product to which the RFID tag is attached is placed on a checkout table. A purchaser inserts cash for the product price into a cash slot or inserts a credit card to complete payment, and receives the product automatically packed in a shopping bag, so that the purchase of the product is able to be completed in the unmanned convenience store.

Hereinafter, exemplary embodiments that are a specific illustration of a wireless communication device according to the present invention will be described with reference to the attached drawings. As the product to which the wireless communication device is to be attached, all products handled in a store, such as convenience store and supermarket, are considered.

Although a microwave oven that performs dielectric heating will be described as an electromagnetic wave heating device described in the following exemplary embodiments, a heating device having a function of performing dielectric heating is considered as the electromagnetic wave heating device of the present invention. Further, in the following exemplary embodiments, an RFID tag attached to the product will be described as an example of the wireless communication device.

First Exemplary Embodiment

Figure 1A:
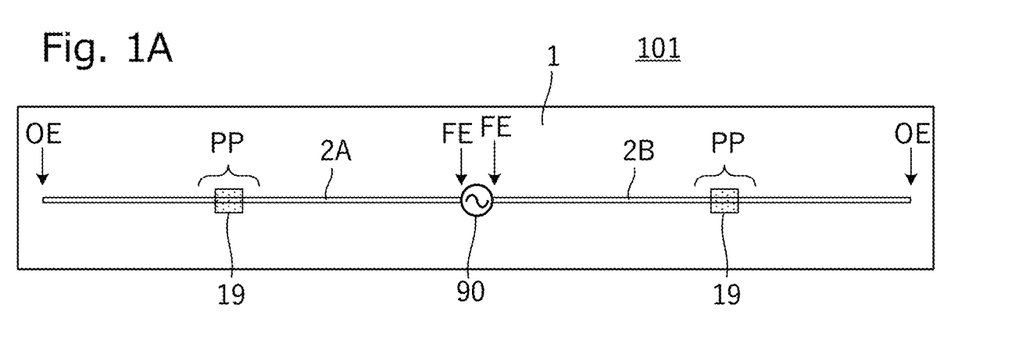
FIG. 1A is a plan view of an RFID tag 101 according to a first exemplary embodiment.
Figure 1B:
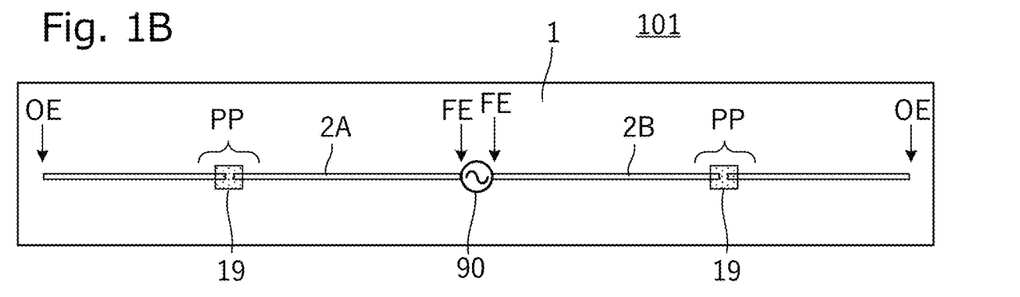
FIG. 1B is a plan view of the RFID tag 101 illustrating a state after a portion of an antenna pattern breaks.

FIG. 1A is a plan view of an RFID tag 101 according to a first exemplary embodiment, and FIG. 1B is a plan view of the RFID tag 101 illustrating a state after a portion of an antenna pattern breaks.

As illustrated in FIG. 1A, the RFID tag 101 includes a base material 1 made of an insulator or a dielectric, antenna patterns 2A, 2B provided on the base material 1, and a feeding circuit 90 that supplies power to the antenna patterns 2A, 2B.

The RFID tag 101 of the present exemplary embodiment is configured to conduct wireless communication (i.e., transmission and reception) using a high-frequency signal having a frequency (e.g., a carrier frequency) of a communication signal in a UHF band. The UHF band is a frequency band of 860 MHz to 960 MHz. Here, the frequency of the communication signal in the UHF band is an example of a frequency of a communication signal in the present disclosure.

The feeding circuit 90, for example, is an RFIC element, an RFIC package, or the like to be illustrated below. In the RFID tag 101 of the present exemplary embodiment, a flexible film material or a flame-retardant film material is used as the base material 1. The base material 1 has an outline of a rectangular shape in a plan view. In addition, in a case in which the base material 1 is a normal film material that is not flame-retardant, a thickness of the base material 1 may be less than or equal to 38 µm, for example. Consequently, before burning, the base material 1 melts and deforms, allowing the shape of the base material not to be maintained.

In a case in which a flame-retardant film is used as the base material 1, for example, a film in which a halogen-based flame-retardant material is added to a resin material such as a PET (polyethylene terephthalate) resin and a PPS (polyphenylene sulfide) resin or a film in which such a resin material is coated with a flame-retardant coating material is used as the flame-retardant film material to be used. As a material for the base material 1, a resin material which has high functions in terms of heat resistance, hydrolysis resistance and chemical resistance, such as a heat-resistant PEN (polyethylene naphthalate) resin, is also able to be used. It is noted that a flame-retardant material is not necessarily needed for the base material 1, and the base material 1 is also able to be made of a paper material, for example.

The antenna patterns 2A, 2B are provided on a surface of the base material 1. The feeding circuit 90 is electrically connected to the antenna patterns 2A, 2B provided on the surface of the base material 1.

The antenna patterns 2A, 2B are made of a metal material having high conductivity, such as an aluminum foil and a copper foil, for example. It be noted that a carbon-based material in addition to the metal material may be used.

As illustrated in FIG. 1A, the antenna patterns 2A, 2B extend from the feeding circuit 90 in opposite directions. The antenna patterns 2A, 2B are patterns configuring a dipole type electric field antenna in which the feeding circuit 90 is connected to a feeding circuit connection end FE, and a leading end is an open end OE.

The RFID tag 101 includes an expansion member 19 adjacent to a predetermined adjacent position PP of the antenna patterns 2A, 2B. In the present exemplary embodiment, the expansion member 19 overlaps the antenna patterns 2A, 2B in a plan view. In other words, the expansion member 19 is adjacent to the antenna patterns 2A, 2B in a thickness direction.

When the RFID tag 101 is irradiated with the electromagnetic wave heating microwave, each of the expansion member 19, the antenna patterns 2A, 2B, and the base material 1 is heated, and raises the temperature. The coefficient of linear expansion of the expansion member 19 is higher than the coefficients of linear expansion of the antenna patterns 2A, 2B, and the base material 1. Therefore, a difference in the amount of expansion occurs in the expansion member 19 and the antenna patterns 2A, 2B, with a temperature rise, and a tensile stress is applied to the antenna patterns 2A, 2B.

In the present exemplary embodiment, since the antenna patterns 2A, 2B are made of metal foil, as the tensile stress applied to the antenna patterns 2A, 2B is increased, the antenna patterns 2A, 2B are elastically deformed, and, after reaching a yield point when exceeding an elastic limit, reaching a lower yield point, and further being subjected to the maximum stress, then break. In other words, when being irradiated with the electromagnetic wave heating microwave, the antenna patterns 2A, 2B break at the adjacent position PP of the expansion member 19. FIG. 1B illustrates a state after the antenna patterns 2A, 2B are broken at the adjacent position PP in such a manner.

As illustrated in FIG. 1B, when the antenna patterns 2A, 2B are broken at the adjacent position PP of the expansion member 19, effective lengths of the antenna patterns 2A, 2B are shortened, and the resonance is not generated at the frequency of the electromagnetic wave heating microwave band. Thus, even when the irradiation of the electromagnetic wave heating microwave continues, a resonance current due to the microwave does not flow in the antenna patterns 2A, 2B, the temperature rise stops, and the ignition (e.g., combustion) does not occur.

Examples of a resonance mode at the frequency of the communication signal and a resonance mode at the frequency of the electromagnetic wave heating microwave in the antenna patterns 2A, 2B will be illustrated with reference to FIG. 2A, FIG. 2B, FIG. 2C, and FIG. 2D. FIG. 2A, FIG. 2B, FIG. 2C, and FIG. 2D illustrate an example of a resonance mode at a frequency of a communication signal or a resonance mode at a frequency of an electromagnetic wave heating microwave in terms of a current distribution and a voltage distribution. In the resonance mode illustrated in FIG. 2A, fundamental resonance is generated at a resonance frequency fo and at a quarter wavelength from a feeding end to an open end. In the resonance mode illustrated in FIG. 2B, harmonic resonance is generated at a resonance frequency $2fo$ and at a half wavelength from the feeding end to the open end. In the resonance mode illustrated in FIG. 2C, the harmonic resonance is generated at a resonance frequency $3fo$ and at a three-quarter wavelength from the feeding end to the open end. In the resonance mode illustrated in FIG. 2D, the harmonic resonance is generated at a resonance frequency $4fo$ and at one wavelength from the feeding end to the open end.

Figure 2A:
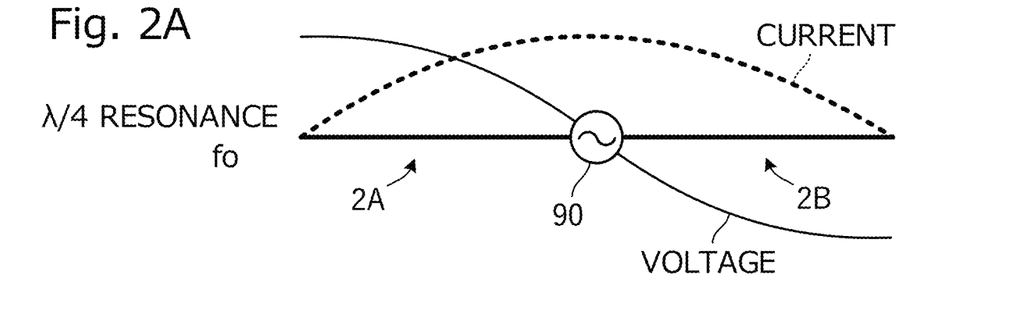
FIG. 2A, FIG. 2B, FIG. 2C, and FIG. 2D illustrate an example of a resonance mode at a frequency of a communication signal or a resonance mode at a frequency of an electromagnetic wave heating microwave in terms of a current distribution and a voltage distribution.
Figure 2B:
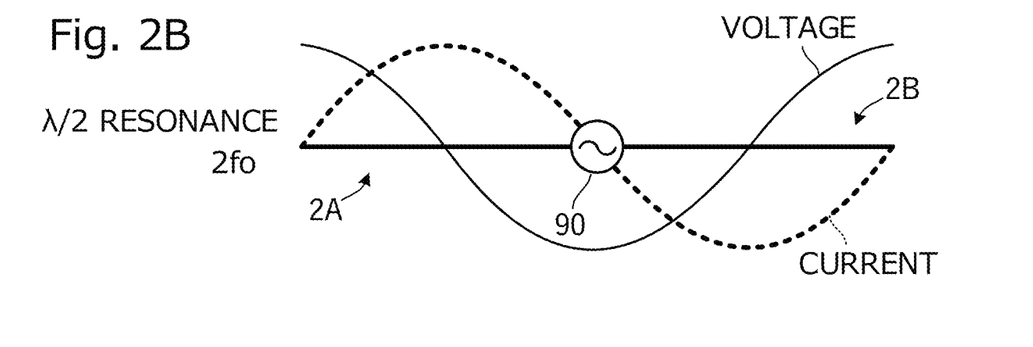
Figure 2C:
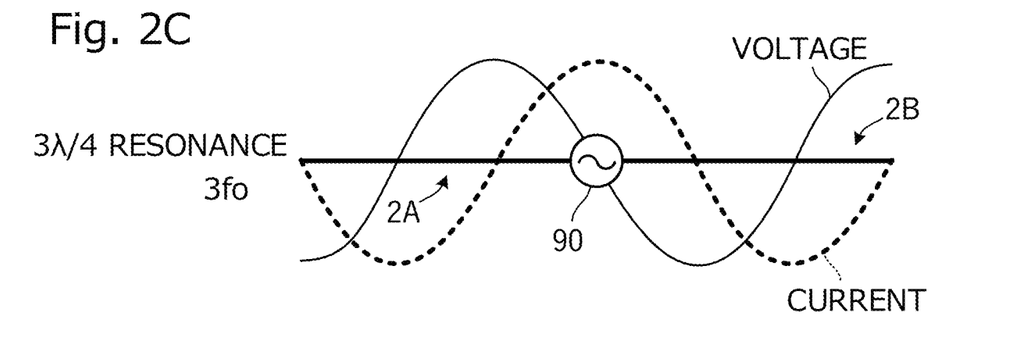
Figure 2D:
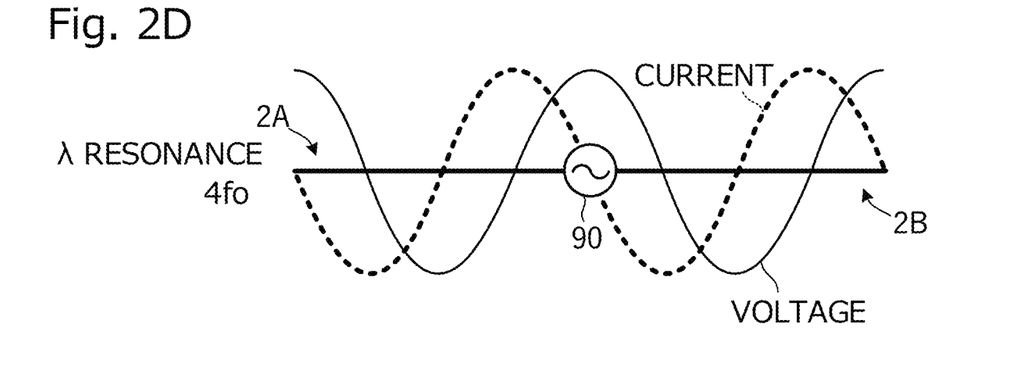

The dipole type antenna of the antenna patterns 2A, 2B resonates at the frequency of a communication signal, for example, at the quarter wavelength illustrated in FIG. 2A. Alternatively, the dipole type antenna resonates at the half wavelength illustrated in FIG. 2B. Under the condition that high-order resonance modes as illustrated in FIG. 2B, FIG. 2C, and FIG. 2D are generated at the frequency of the electromagnetic wave heating microwave in the dipole type antenna, a large current is induced in the antenna patterns 2A, 2B by the high power of the microwaves, and heat is generated. However, as illustrated in FIG. 1B, the antenna patterns 2A, 2B are broken at an intermediate position of the antenna patterns 2A, 2B, so that the antenna patterns 2A, 2B are substantially shortened, and the resonance is not generated at the frequency of the electromagnetic wave heating microwave band, and thus, even when the irradiation of the electromagnetic wave heating microwave continues, the resonance current due to the microwave does not flow in the antenna patterns 2A, 2B, the temperature rise is stopped, and the ignition (combustion) does not occur.

Figure 3A:
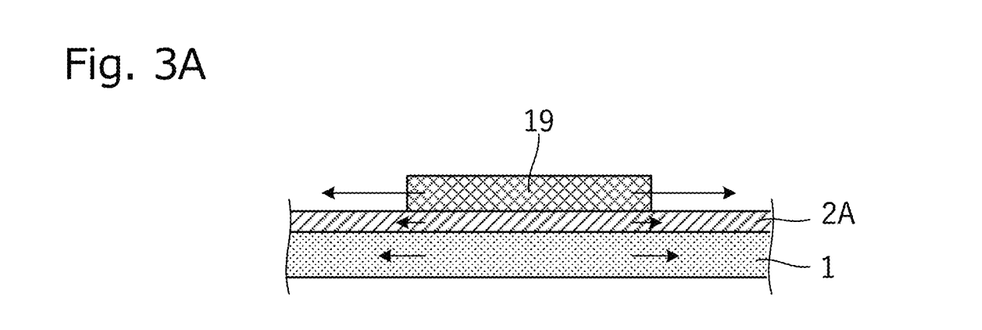
FIG. 3A and FIG. 3B are partial cross-sectional views illustrating an example of a structure of a position at which an expansion member 19 is provided, with respect to a base material 1.
Figure 3B:
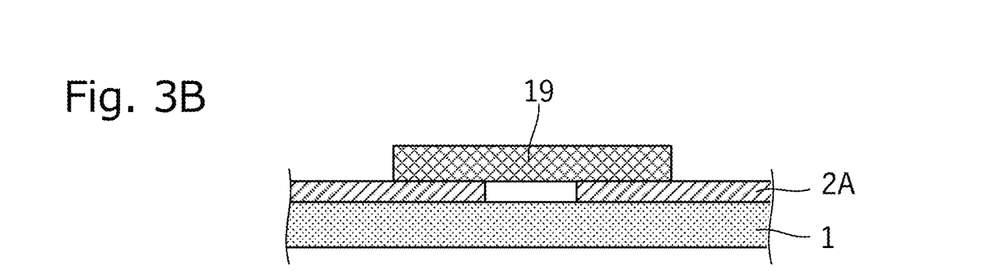

FIG. 3A and FIG. 3B are partial cross-sectional views illustrating an example of a structure of a position at which an expansion member 19 is provided, with respect to a base material 1.

In the example illustrated in FIG. 3A, the antenna pattern 2A is provided on the top surface of the base material 1, and the expansion member 19 is provided on the top surface of the base material 1 so as to cover a portion of the antenna pattern 2A. This expansion member 19 may be formed by baking of paste or heating and drying of the paste after printing thereof. The expansion member 19 may also be formed by attaching of a resin sheet formed into a sheet shape.

When the RFID tag 101 is irradiated with the electromagnetic wave heating microwave, each of the expansion member 19, the antenna pattern 2A, and the base material 1 is heated, and raises the temperature. The coefficient of linear expansion of the expansion member 19 is higher than the coefficients of linear expansion of the antenna pattern 2A and the base material 1. Therefore, the amount of expansion of the expansion member 19 due to the temperature rise is larger than the amount of extension of the antenna pattern 2A due to the temperature rise, and a tensile stress is applied to the antenna pattern 2A with the temperature rise. The arrow in FIG. 3A conceptually indicates the magnitude of expansion of each layer. When the tensile stress of the antenna pattern 2A exceeds a predetermined value, as illustrated in FIG. 3B, the antenna pattern 2A breaks.

Figure 4A:
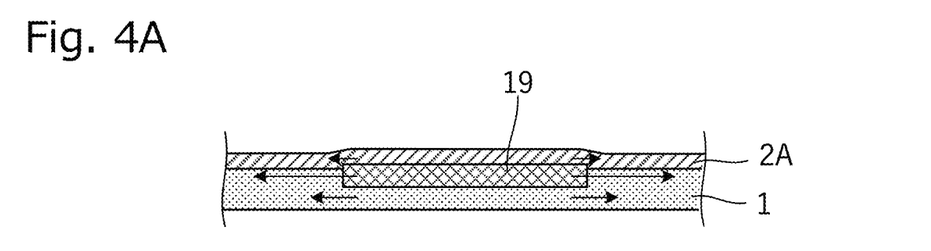
FIG. 4A and FIG. 4B are partial cross-sectional views illustrating an example of a structure of a position at which an expansion member 19 is provided, with respect to a base material 1.
Figure 4B:
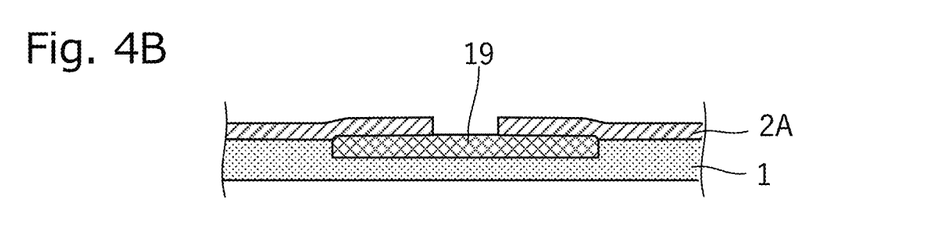

FIG. 4A and FIG. 4B are partial cross-sectional views illustrating an example of a structure of a position at which the expansion member 19 is provided, with respect to the base material 1.

In the example illustrated in FIG. 4A, the expansion member 19 is provided on the top surface of the base material 1, and the antenna pattern 2A is provided on the base material 1 so as to pass over this expansion member 19. The expansion member 19 may be formed by baking of paste or heating and drying of the paste after printing thereof. The expansion member 19 may also be formed by attaching of a resin sheet formed into a sheet shape. Even with the structure illustrated in this FIG. 4A, the RFID tag 101 is irradiated with the electromagnetic wave heating microwave, so that the temperature of each portion rises, and a tensile stress is applied to the antenna pattern 2A as the temperature rises. The arrow in FIG. 4A conceptually indicates the magnitude of expansion of each layer. When the tensile stress of the antenna pattern 2A exceeds a predetermined value, as illustrated in FIG. 4B, the antenna pattern 2A breaks.

It is noted that, although the antenna pattern 2A is illustrated in the example illustrated in FIG. 3A, FIG. 3B, FIG. 4A, and FIG. 4B, the same applies to the antenna pattern 2B.

Generally, "thermal expansion" is macroscopically a phenomenon in which an object expands by a temperature rise, but microscopically a phenomenon that reflects how space between molecules spreads out when unit kinetic energy is given to the molecules. Therefore, coupling or strength of interaction between molecules or atoms governs the coefficient of thermal expansion. In other words, the coefficient of thermal expansion of the expansion member is able to be previously determined by selection of a resin material.

A physical property value with respect to thermal expansion includes a "coefficient of linear expansion" defined as the rate of change in length corresponding to a temperature rise and a "coefficient of volume expansion" defined as the rate of change in volume corresponding to a temperature rise, and the coefficients are proportional to each other. The coefficient of linear expansion [$\times 10^{-6}$/K] of a typical high expansion coefficient resin material having a high coefficient of thermal expansion is as follows:

| | |
|---|---|
| Polyethylene (low density) | 180 to 200 |
| Polyethylene (high density) | 110 to 130 |
| Polyvinylidene chloride | 190 |
| Polyamide 66 | 80 to 100 |
| Cellulose acetate | 110 to 170 |
| Polyurethane resin | 100 to 200 |

On the other hand, any resin to be used for the base material 1 has a small coefficient of linear expansion, compared with the expansion member 19, as follows:

| | |
|---|---|
| Polyethylene terephthalate | 65 |
| Polyphenylene sulfide | 49 |
| Polyethylene naphthalate | 21 |

In addition, any metal to be used for the antenna patterns 2A, 2B has a small coefficient of linear expansion, compared with the expansion member 19, as follows:

| | |
|---|---|
| Copper | 16.6 |
| Aluminum | 23.0 |

Here, when the coefficient of linear expansion of the base material 1, the coefficient of linear expansion of the antenna patterns 2A, 2B, and the coefficient of linear expansion of the expansion member 19 are respectively represented by E1, E2, and E19, the relationship of E2<E19 is satisfied. When E19 is more than twice as large as E2, the tensile stress is able to be more effectively increased. In addition, in order to effectively increase the tensile stress with respect to the antenna patterns 2A, 2B, E2<E1 is preferably satisfied. Further, when the significance of providing the expansion member 19 is considered, E1<E19 is preferably satisfied, naturally.

Second Exemplary Embodiment

In a second exemplary embodiment, an RFID tag in which the shapes of an antenna pattern and an expansion member are different from the example illustrated in the first exemplary embodiment will be described.

Figure 5A:
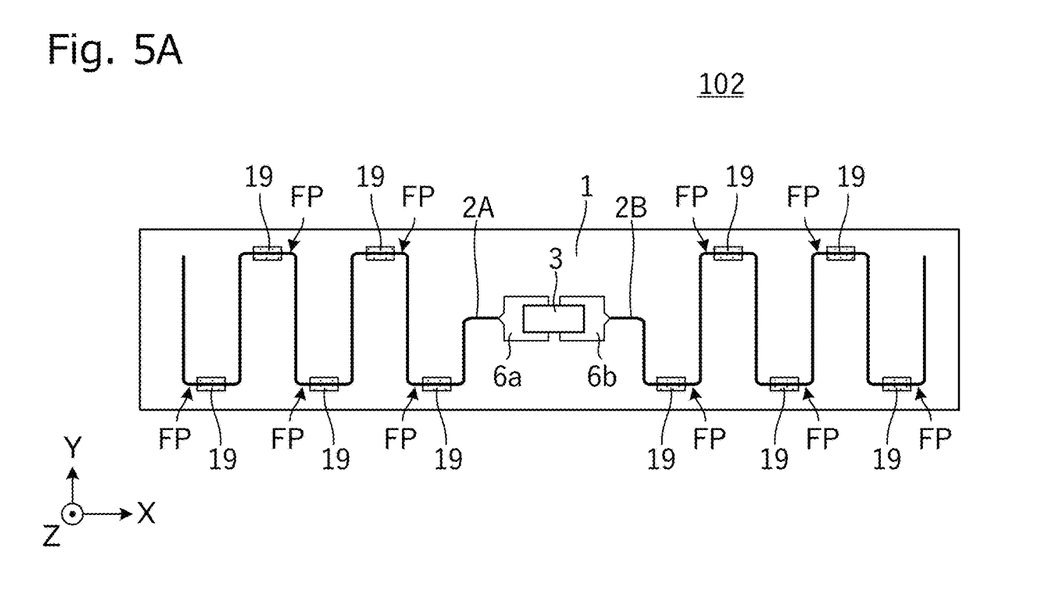
FIG. 5A and FIG. 5B are plan views of an RFID tag 102 according to a second exemplary embodiment.
Figure 5B:
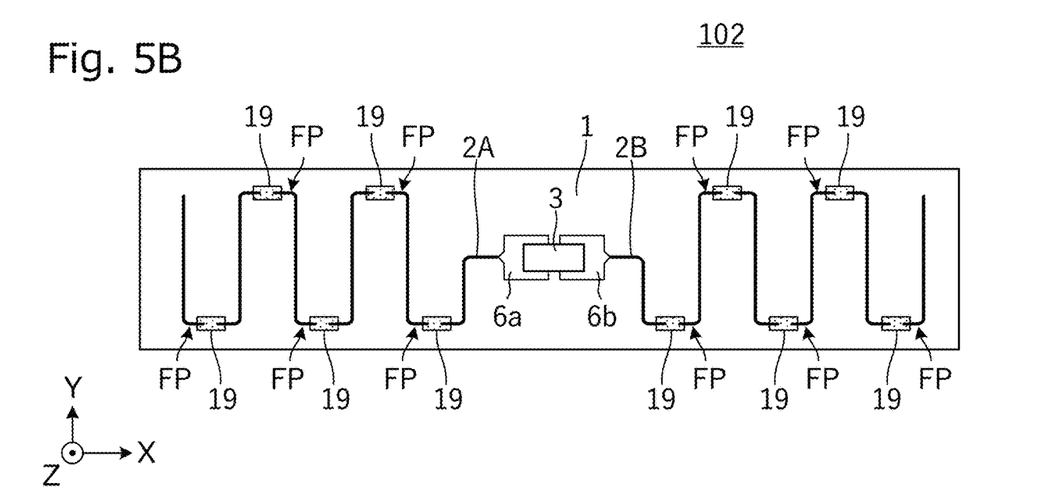

FIG. 5A and FIG. 5B are plan views of an RFID tag 102 according to the second exemplary embodiment.

The RFID tag 102 illustrated in FIG. 5A and FIG. 5B includes a base material 1 made of an insulator or a dielectric, antenna patterns 2A, 2B provided on the base material 1, and an RFIC package 3 connected to the antenna patterns 2A, 2B. A plurality of expansion members 19 are provided on the base material 1.

As illustrated in FIG. 5A, the antenna patterns 2A, 2B have a meandering line shape and are each configured to extend, with the first antenna pattern 2A having the meandering line shape that meanders from a first land pattern 6a on which the RFIC package 3 is mounted while including a plurality of folded portions FP, and with the second antenna pattern 2B having the meandering line shape that meanders from a second land pattern 6b on which the RFIC package 3 is mounted while including a plurality of folded portions. In other words, the first antenna pattern 2A having the meandering line shape extends from the first land pattern 6a toward one end in a longitudinal direction (e.g., in a negative X direction) of the base material 1. In addition, the second antenna pattern 2B having the meandering line shape extends from the second land pattern 6b toward the other end in the longitudinal direction (e.g., in a positive X direction) of the base material 1.

With the above configuration, the antenna patterns 2A, 2B act as a dipole type electric field antenna.

The folded portions FP of the antenna patterns 2A, 2B are places in which the extending direction of each of the antenna patterns 2A, 2B is reversed. The expansion member 19 is provided at the folded portions FP of the antenna patterns 2A, 2B.

When the RFID tag 102 is irradiated with the electromagnetic wave heating microwave, the expansion member 19 expands as a temperature rises. Then, portions of the antenna patterns 2A, 2B in which the expansion member 19 is provided expand, and the antenna patterns 2A, 2B break. FIG. 5B illustrates a state after the antenna patterns 2A, 2B are broken at a plurality of positions in such a manner.

The RFID tag 102 configured as described above also provides the same effects as the RFID tag 101 illustrated in the first exemplary embodiment. In particular, in the present exemplary embodiment, since the plurality of expansion members 19 are provided for each of the antenna patterns 2A, 2B, even when the breaking does not occur at some portions in which the expansion member 19 is provided, the possibility that the breaking occurs at a position of the antenna patterns 2A, 2B is high.

It is noted that the expansion member 19 may be provided at conductor patterns (e.g., conductor patterns other than the folded portions FP of the antenna patterns 2A, 2B) that are opposed to each other due to the antenna patterns 2A, 2B folded back at the folded portions FP thereof.

Figure 6:
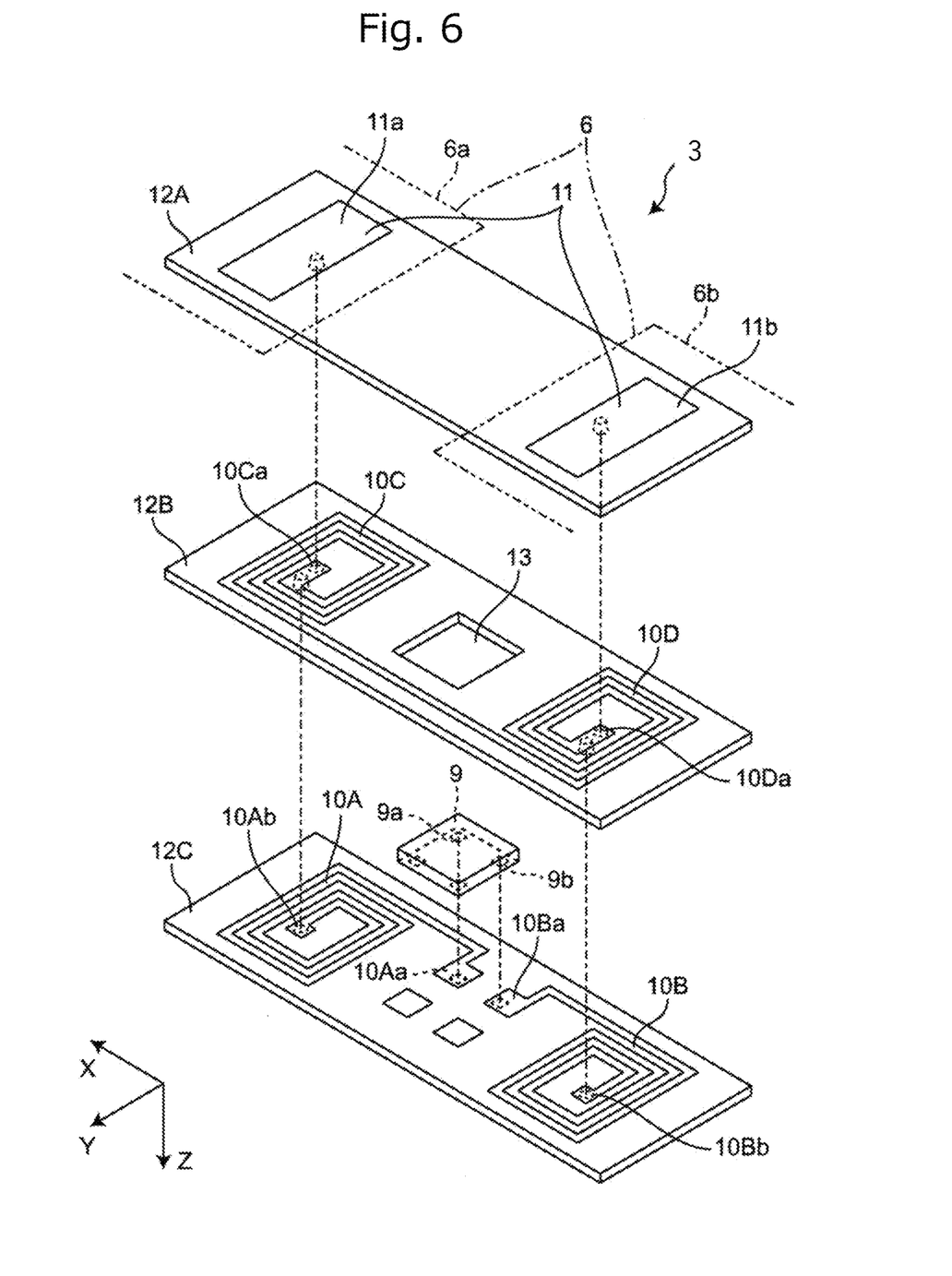
FIG. 6 is an exploded perspective view illustrating a configuration of an RFIC package mounted on a land pattern of the antenna patterns.

FIG. 6 is an exploded perspective view illustrating a configuration of the RFIC package 3 mounted on a land pattern 6 (6a, 6b) of the antenna patterns 2A, 2B. As illustrated in FIG. 6, the RFIC package 3 of the first exemplary embodiment is constructed with a multilayer substrate including three layers. Specifically, the multilayer substrate of the RFIC package 3 is made of a resin material such as polyimide and a liquid crystal polymer, and is formed by stacking three flexible insulation sheets 12A, 12B, 12C. The insulation sheets 12A, 12B, 12C have a substantially quadrilateral shape in a plan view, and have a substantially rectangular shape in the present exemplary embodiment. The RFIC package 3 in FIG. 6 illustrates a state in which the RFIC package 3 illustrated in FIG. 5A is turned over and the three layers are disassembled.

As illustrated in FIG. 6, in the RFIC package 3, an RFIC chip 9, a plurality of inductance elements 10A, 10B, 10C, 10D, and external connection terminals 11 (11a, 11b) to be connected to the antenna patterns 2A, 2B are provided at desired positions on three layered substrates (insulation sheets 12A, 12B, 12C).

The external connection terminals 11a, 11b are provided on the first insulation sheet 12A that defines a lowermost layer (i.e., the substrate opposed to the antenna patterns 2A, 2B), and provided at positions opposed to the land patterns 6a, 6b of the antenna patterns 2A, 2B. The four inductance elements 10A, 10B, 10C, 10D are separated into groups of two and provided on the second insulation sheet 12B and the third insulation sheet 12C. In other words, the first inductance element 10A and the second inductance element 10B are provided on the third insulation sheet 12C that defines an uppermost layer (i.e., a layer described at the lowest position in FIG. 6), and the third inductance element 10C and the fourth inductance element 10D are provided on the second insulation sheet 12B that defines an intermediate layer.

In the RFIC package 3 of the present exemplary embodiment, the external connection terminals 11a, 11b and the four inductance elements 10A, 10B, 10C, 10D are constructed with a conductor pattern made of a conductive material such as an aluminum foil and a copper foil.

As illustrated in FIG. 6, the RFIC chip 9 is mounted on the third insulation sheet 12C that defines the uppermost layer, in a central portion in the longitudinal direction (e.g., the X direction in FIG. 6). The RFIC chip 9 has a structure in which an RF circuit is provided on a semiconductor substrate made of a semiconductor such as silicon. The first inductance element 10A formed into a spiral shape on one side (e.g., a side in the positive X direction in FIG. 6) in the longitudinal direction on the third insulation sheet 12C is connected to one input-output terminal 9a of the RFIC chip 9 through a land 10Aa. The second inductance element 10B formed into a spiral shape on the other side (e.g., a side in the negative X direction in FIG. 6) in the longitudinal direction on the third insulation sheet 12C is connected to the other input-output terminal 9b of the RFIC chip 9 through a land 10Ba.

The spiral-shaped third inductance element 10C is provided on one side (e.g., the side in the positive X direction in FIG. 6) in the longitudinal direction on the second insulation sheet 12B that defines the intermediate layer, and the spiral-shaped fourth inductance element 10D is provided on the other side (e.g., the side in the negative X direction in FIG. 6) in the longitudinal direction on the second insulation sheet 12B. The end on the outer peripheral side of the spiral-shaped third inductance element 10C and the end on the outer peripheral side of the spiral-shaped fourth inductance element 10D are directly connected to each other. On the other hand, a land 10Ca that is an end on an inner peripheral side of the third inductance element 10C is connected to a land 10Ab that is an end on the inner peripheral side of the spiral-shaped first inductance element 10A on the third insulation sheet 12C through an interlayer connection conductor such as a via conductor that penetrates the second insulation sheet 12B. In addition, the land 10Ca that is an end on the inner peripheral side of the third inductance element 10C is connected to the first external connection terminal 11a on the first insulation sheet 12A through an interlayer connection conductor such as a through-hole conductor that penetrates the first insulation sheet 12A that defines the lowermost layer.

A land 10Da that is an end on the inner peripheral side of the fourth inductance element 10D is connected to a land 10Bb that is an end on the inner peripheral side of the spiral-shaped second inductance element 10B on the third insulation sheet 12C through an interlayer connection conductor such as a through-hole conductor that penetrates the second insulation sheet 12B. In addition, the land 10Da that is the end on the inner peripheral side of the fourth inductance element 10D is connected to the second external connection terminal 11b on the first insulation sheet 12A through an interlayer connection conductor such as a through-hole conductor that penetrates the first insulation sheet 12A that defines the lowermost layer.

The first external connection terminal 11a on the first insulation sheet 12A is disposed so as to be connected to the first land pattern 6a of the first antenna pattern 2A provided on the base material 1. In addition, the second external connection terminal 11b on the first insulation sheet 12A is disposed to be connected to the second land pattern 6b of the second antenna pattern 2B provided on the base material 1.

Moreover, a through-hole 13 in which the RFIC chip 9 mounted on the third insulation sheet 12C is accommodated is provided in the second insulation sheet 12B that defines the intermediate layer. The RFIC chip 9 is disposed between the first inductance element 10A and the second inductance element 10B and between the third inductance element 10C and the fourth inductance element 10D. For this reason, the RFIC chip 9 is configured to function as a shield and magnetic field coupling and electric field coupling between the first inductance element 10A and the second inductance element 10B are reduced or prevented, and similarly magnetic field coupling and electric field coupling between the third inductance element 10C and the fourth inductance element 10D are reduced or prevented. As a result, in the RFIC package 3, narrowing of a passband of the communication signal is reduced or prevented, and the passband is widened.

In the present exemplary embodiment, while the RFIC package 3 is mounted on the antenna patterns 2A, 2B, the RFIC chip 9 may be directly mounted on the antenna patterns 2A, 2B. Further, in such a case, the inductors configured as the plurality of inductance elements 10A, 10B, 10C, 10D in the RFIC package 3 may be configured on the base material 1 while having a loop-shaped pattern.

Figure 7:
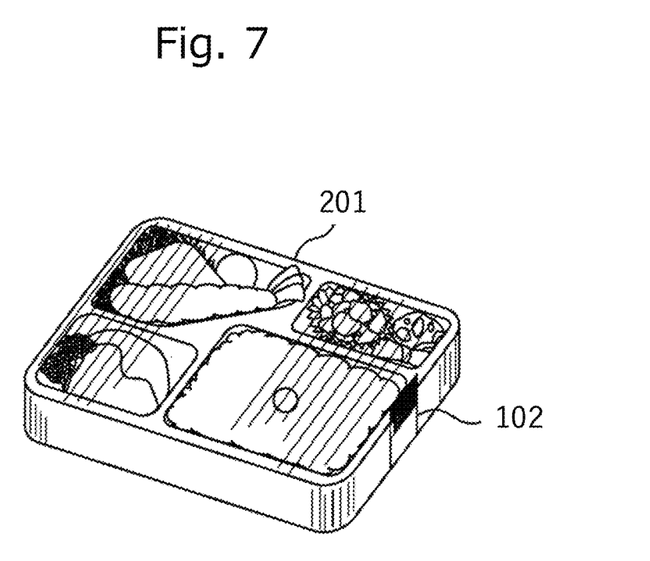
FIG. 7 illustrates an example of a product to which an RFID tag is attached, and is a perspective view illustrating a lunch box 201 to which the RFID tag is attached.

FIG. 7 illustrates an example of a product to which an RFID tag is attached, and is a perspective view illustrating a lunch box 201 to which the RFID tag 102 is attached.

As described above, even when the lunch box 201 to which the RFID tag 102 is attached is heated by the microwave oven, the ignition of the RFID tag 102 and, further, the melting and deformation of a wrapping film of the lunch box to which the RFID tag 102 is attached is able to be prevented.

Third Exemplary Embodiment

In a third exemplary embodiment, an example of an RFID tag different from the second exemplary embodiments in a shape of the expansion member and a position at which the expansion member is provided will be described.

Figure 8A:
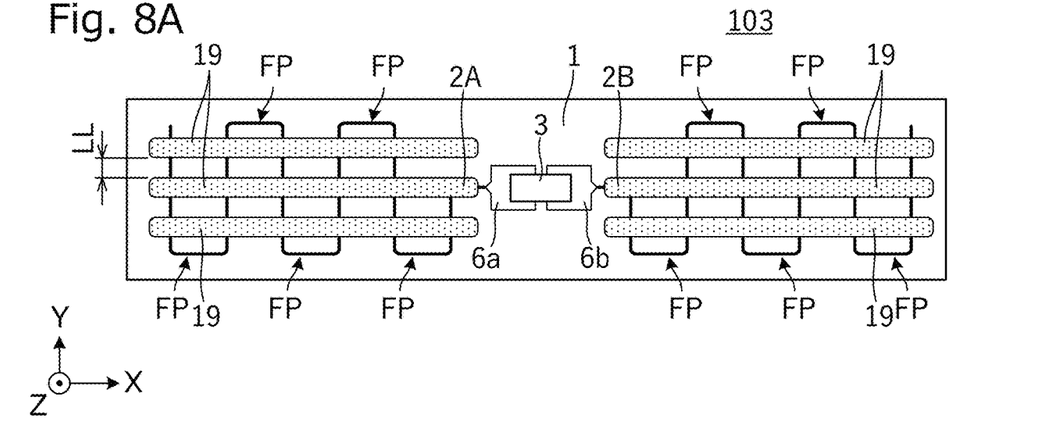
FIG. 8A and FIG. 8B are plan views of an RFID tag 103 according to a third exemplary embodiment.
Figure 8B:
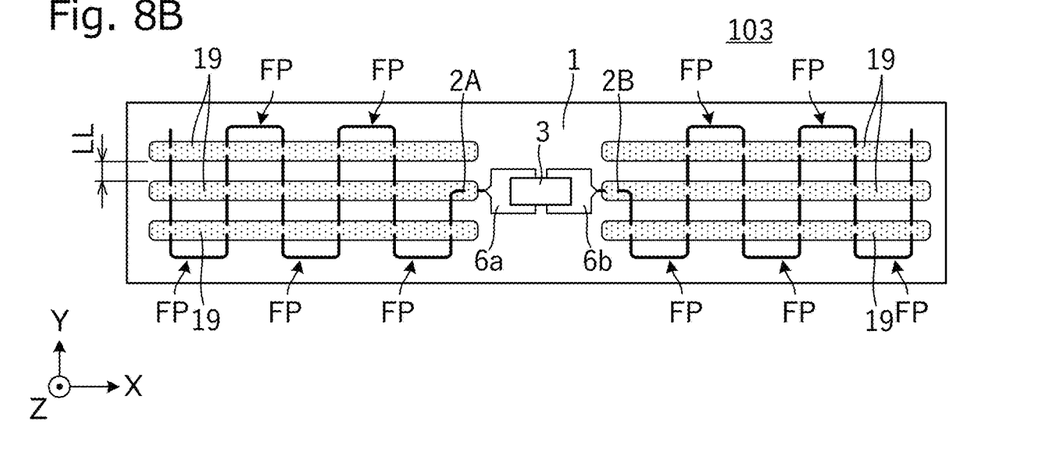
Figure 8C:
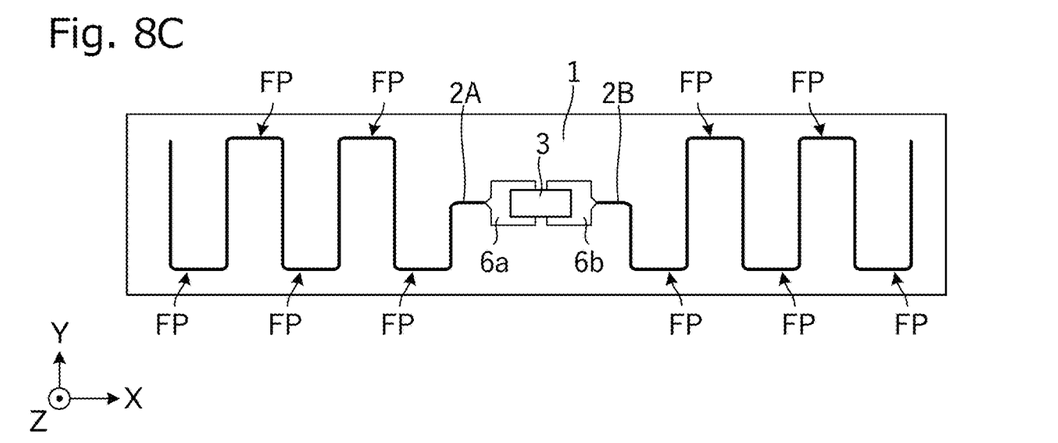
FIG. 8C is a plan view of an RFID tag as a comparative example, without the expansion member 19.

FIG. 8A and FIG. 8B are plan views of an RFID tag 103 according to the third exemplary embodiment. FIG. 8C is a plan view of an RFID tag as a comparative example, without the expansion member 19.

As illustrated in FIG. 8A, the RFID tag 103 includes a base material 1 made of an insulator or a dielectric, antenna patterns 2A, 2B provided on the base material 1, and an RFIC package 3 connected to the antenna patterns 2A, 2B. An expansion member 19 is provided at a predetermined position on the base material 1.

As illustrated in FIG. 8A and FIG. 8B, the antenna patterns 2A, 2B have a meandering line shape and are each configured to extend, with the first antenna pattern 2A having the meandering line shape that meanders from a first land pattern 6a on which the RFIC package 3 is mounted while including a plurality of folded portions FP, and with the second antenna pattern 2B having the meandering line shape that meanders from a second land pattern 6b on which the RFIC package 3 is mounted while including a plurality of folded portions. In other words, the first antenna pattern 2A having the meandering line shape extends from the first land pattern 6a toward one end in a longitudinal direction (e.g., in a negative X direction) of the base material 1. In addition, the second antenna pattern 2B having the meandering line shape extends from the second land pattern 6b toward the other end in the longitudinal direction (e.g., in a positive X direction) of the base material 1.

With the above configuration, the antenna patterns 2A, 2B act as a dipole type electric field antenna.

The expansion member 19 is provided so as to cross a plurality of points of the antenna patterns 2A, 2B. In the present exemplary embodiment, the expansion member 19 is disposed so as to be perpendicular to conductor patterns (e.g., conductor patterns extending in a Y direction) that are opposed to each other due to the antenna patterns 2A, 2B folded back at the folded portions FP.

When the RFID tag 103 is irradiated with the electromagnetic wave heating microwave, in the antenna patterns 2A, 2B, a tensile stress is applied to the antenna patterns 2A, 2B at a position at which the expansion member 19 is provided, and the antenna patterns 2A, 2B break at the position at which the expansion member 19 is provided. FIG. 8B illustrates a state after the antenna patterns 2A, 2B are broken in such a manner.

As illustrated in FIG. 8A and FIG. 8B, a distance LL between the expansion member 19 and the expansion member 19 that are adjacent to each other along a line of the antenna patterns 2A, 2B preferably satisfies the relationship LL≤λ/4. Here, λ is a wavelength of the electromagnetic wave heating microwave band.

As illustrated in FIG. 8B, the antenna patterns 2A, 2B are divided at the position at which the expansion member 19 is provided, so that the maximum line length of a conductor pattern is LL. When this line length LL satisfies the above relationship, the resonance is not generated with the electromagnetic wave heating microwave, so that a line segment after this division does not generate heat by the resonance.

Figure 9A:
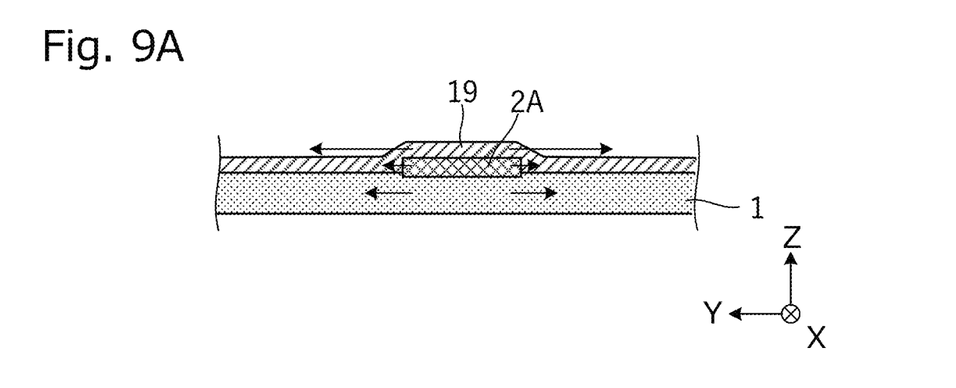
FIG. 9A and FIG. 9B are partial cross-sectional views of a position at which the expansion member 19 is provided with respect to the base material 1, in a structure illustrated in FIG. 8A and FIG. 8B.
Figure 9B:
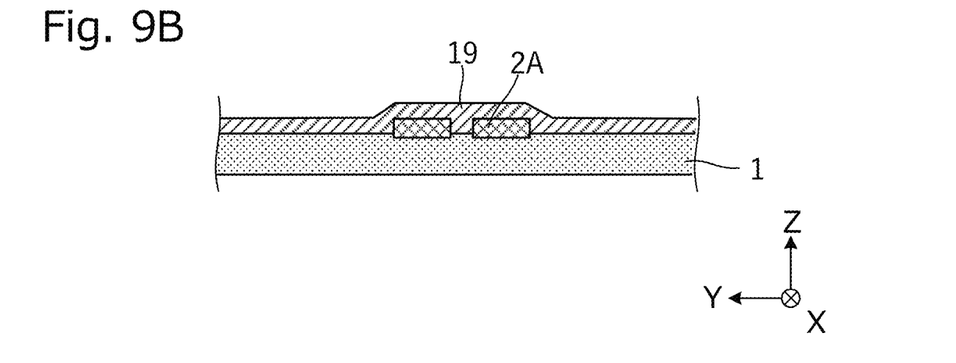

FIG. 9A and FIG. 9B are partial cross-sectional views of the position at which the expansion member 19 is provided with respect to the base material 1, in a structure illustrated in FIG. 8(A) and FIG. 8(B).

When the RFID tag 103 is irradiated with the electromagnetic wave heating microwave, the temperature of each portion rises, and the antenna pattern 2A is subject to a tensile stress as the temperature rises. The arrows in FIG. 9A conceptually indicates the magnitude of expansion of each portion with these line lengths. When the tensile stress of the antenna pattern 2A exceeds a predetermined value, as illustrated in FIG. 4B, the antenna pattern 2A breaks.

As described above, as have illustrated in some exemplary embodiments, the antenna patterns 2A, 2B are broken at an intermediate point of the antenna patterns 2A, 2B, so that the antenna patterns 2A, 2B do not resonate at the frequency of the electromagnetic wave heating microwave. The expansion member 19 may be disposed at a position such that the breaking of the antenna patterns 2A, 2B at the position causes the resonance not to be generated with the electromagnetic wave heating microwave, or in an area including the position.

It is noted that the expansion member 19 may be provided only on one of the first antenna pattern 2A and the second antenna pattern 2B. Even in such a case, when the antenna patterns 2A, 2B are broken at the adjacent position of the expansion member 19, the effective lengths of the antenna patterns 2A, 2B are shortened, the resonance with the electromagnetic wave heating microwave is not maintained, and the heat generation of the antenna patterns 2A, 2B is stopped.

In addition, although, in the example illustrated in FIG. 5A, FIG. 5B, FIG. 8A, and FIG. 8B, the shapes of the first antenna pattern 2A and the second antenna pattern 2B have a line symmetry relationship with respect to the feeding point (e.g., the position of the RFIC package 3), the shapes of the two antenna patterns 2A, 2B may have a point symmetry relationship with respect to the feeding point. Further, the shapes of the two antenna patterns 2A, 2B may be asymmetric.

As described above, as have been illustrated in each exemplary embodiment using a specific configuration, according to these exemplary embodiments, in a case in which a product to which an RFID tag is attached is heated by the electromagnetic wave heating device, ignition of the RFID tag and, further, melting or deformation of members of the product to which the RFID tag is attached can be prevented. Therefore, the exemplary embodiments of the present invention provide the wireless communication device that constructs a system that automates accounting and packing of a purchased product in a store such as a convenience store that handles a wide variety of products such as food items and household goods, and makes great advance toward the practical application of the "unmanned" convenience store.

Lastly, it is noted that the description of the above exemplary embodiments is illustrative in all respects but not restrictive. Modifications and changes are able to appropriately be made by those skilled in the art.

The exemplary embodiments of the present invention are highly versatile and useful as a wireless communication device attached to products, and is a necessary product particularly in the realization of the "unmanned" convenience store.

REFERENCE SIGNS LIST

FE—feeding circuit connection end
OE—open end
PP—adjacent position
1—base material
2A—first antenna pattern
2B—second antenna pattern
3—RFIC package
6—land pattern
6a—first land pattern
6b—second land pattern
9—RFIC chip
9a, 9b—input and output terminal
10A—first inductance element
10B—second inductance element
10C—third inductance element
10D—fourth inductance element
10Aa, 10Ab, 10Ba, 10Bb, 10Ca, 10Da—land
11—external connection terminal
11a—first external connection terminal
11b—second external connection terminal
12A—first insulation sheet
12B—second insulation sheet
12C—third insulation sheet
13—through hole
19—expansion member
90—feeding circuit
101, 102, 103—RFID tag
201—lunch box

The invention claimed is:

1. A wireless communication device for transmitting and receiving a communication signal, the wireless communication device comprising:
   a base material;
   an antenna pattern disposed along a surface of the base material; and
   an expansion member disposed adjacent to the antenna pattern and having a coefficient of linear expansion that is higher than respective coefficients of linear expansion of both the antenna pattern and the base material.

2. The wireless communication device according to claim 1, wherein the expansion member is disposed in contact with a portion of the antenna pattern.

3. The wireless communication device according to claim 2, wherein the expansion member is disposed at a breaking position such that a breaking of the antenna pattern at the breaking position prevents a resonance at a frequency of an electromagnetic wave heating microwave.

4. The wireless communication device according to claim 1, wherein the antenna pattern is in contact with the base material.

5. The wireless communication device according to claim 4, wherein the coefficient of linear expansion of the base material is higher than the coefficient of linear expansion of the antenna pattern.

6. The wireless communication device according to claim 1, wherein the expansion member comprises a resin material and the antenna pattern comprises a metal foil.

7. The wireless communication device according to claim 1, further comprising a feeding circuit disposed on the base material, wherein the antenna pattern comprises a pair of antenna patterns extending from the feeding circuit in opposite directions to form a dipole electric field antenna.

8. A wireless communication device for transmitting and receiving a communication signal, the wireless communication device comprising:
   a base material;
   an antenna pattern disposed along a surface of the base material; and
   an expansion member disposed adjacent to the antenna pattern and having a coefficient of linear expansion that is higher than respective coefficients of linear expansion of both the antenna pattern and the base material,
   wherein the expansion member overlaps the antenna pattern in a plan view that is orthogonal to a surface of the base material.

9. The wireless communication device according to claim 8, wherein the expansion member is disposed directly on a surface of the antenna pattern that is opposite to the base material.

10. The wireless communication device according to claim 8, wherein the expansion member is disposed between the antenna pattern and the base material.

11. The wireless communication device according to claim 1, wherein the antenna pattern comprises a meandering line shape and the expansion member overlaps the antenna pattern in a plan view that is orthogonal to a surface of the base material.

12. The wireless communication device according to claim 11, wherein the expansion member overlaps a plurality of turns of the meandering line shape of the antenna pattern.

13. A wireless communication device comprising:
a base;
an antenna pattern disposed on a surface of the base; and
an expansion member disposed at a breaking position that overlaps the antenna pattern in a plan view of the base,
wherein the expansion member has a coefficient of linear expansion that is higher than a coefficient of linear expansion of at least the antenna pattern, such that a tensile stress applied to the antenna pattern due to an expansion of the expansion member breaks the antenna pattern at the breaking position.

14. The wireless communication device according to claim 13, wherein the coefficient of linear expansion of the expansion member is higher than a coefficient of linear expansion of the base.

15. The wireless communication device according to claim 13, wherein the expansion member is disposed in contact with a portion of the antenna pattern.

16. The wireless communication device according to claim 13, wherein a breaking of the antenna pattern at the breaking position and in response to the tensile stress prevents a resonance at a frequency of an electromagnetic wave heating microwave.

17. The wireless communication device according to claim 13, wherein the expansion member is disposed directly on a surface of the antenna pattern that is opposite to the base.

18. The wireless communication device according to claim 13, wherein the expansion member is disposed between the antenna pattern and the base.

19. The wireless communication device according to claim 13, wherein the antenna pattern is in contact with the base and the coefficient of linear expansion of the base is higher than the coefficient of linear expansion of the antenna pattern.

20. The wireless communication device according to claim 13, wherein the expansion member comprises a resin material and the antenna pattern comprises a metal foil.

* * * * *